United States Patent
Cai et al.

(10) Patent No.: US 12,045,448 B2
(45) Date of Patent: Jul. 23, 2024

(54) MESSAGE TRANSMITTING METHOD AND APPARATUS, MESSAGE RECEIVING METHOD AND APPARATUS, DEVICE, AND MEDIUM

(71) Applicant: Tencent Technology (Shenzhen) Company Limited, Guangdong (CN)

(72) Inventors: Bohan Cai, Shenzhen (CN); Xi Yan, Shenzhen (CN); Xucheng Tang, Shenzhen (CN); Zhihao Chen, Shenzhen (CN); Qiuchen Jin, Shenzhen (CN); Runjia Huang, Shenzhen (CN); Qing Huang, Shenzhen (CN); Junjie Liang, Shenzhen (CN); Genxi Xu, Guangdong (CN); Hongfa Qiu, Shenzhen (CN); Yanlan Liu, Shenzhen (CN); Wancheng Zhou, Shenzhen (CN); Jingqiong Feng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 48 days.

(21) Appl. No.: 17/830,872

(22) Filed: Jun. 2, 2022

(65) Prior Publication Data
US 2022/0291815 A1 Sep. 15, 2022

Related U.S. Application Data

(63) Continuation of application No. PCT/CN2021/088392, filed on Apr. 20, 2021.

(30) Foreign Application Priority Data

May 20, 2020 (CN) .......................... 202010432596.8

(51) Int. Cl.
*G06F 3/048* (2013.01)
*G06F 3/0481* (2022.01)
(Continued)

(52) U.S. Cl.
CPC ........ *G06F 3/04842* (2013.01); *G06F 3/0481* (2013.01); *G06F 3/0485* (2013.01); *G06T 13/00* (2013.01); *H04L 51/04* (2013.01)

(58) Field of Classification Search
CPC ... H04L 51/04; G06F 3/04842; G06F 3/0481; G06F 3/0485; G06T 13/00
See application file for complete search history.

(56) References Cited

U.S. PATENT DOCUMENTS 7,908,554 B1 * 3/2011 Blattner ................. G06T 13/40
715/706
10,873,647 B1 * 12/2020 Pilkauskas .............. H04L 43/55
(Continued)

FOREIGN PATENT DOCUMENTS

| CN | 104781759 A | 7/2015 |
| CN | 109412934 A | 3/2019 |

(Continued)

OTHER PUBLICATIONS

International Search Report with English translation and Written Opinion for priority application No. PCT/CN2021/088392 dated Jul. 7, 2021, 11p.
(Continued)

*Primary Examiner* — Patrick F Riegler
(74) *Attorney, Agent, or Firm* — Crowell & Moring LLP

(57) ABSTRACT

A message transmitting method and apparatus provide for a subtle reminder function. Head portraits of at least two user accounts are displayed in a first chat interface. The at least two user accounts include a first user account and a second user account. An interaction message is generated in response to an interaction with the head portrait of the second user account. The interaction message is transmitted to the second user account. The interaction message is used to trigger the display of an animation of the head portrait of the second user account in a second chat interface. This
(Continued)

provides for a new interaction between user accounts, and can provide a subtle reminder function.

20 Claims, 13 Drawing Sheets

(51) Int. Cl.
    *G06F 3/04842*     (2022.01)
    *G06F 3/0485*     (2022.01)
    *G06T 13/00*     (2011.01)
    *H04L 51/04*     (2022.01)

(56) References Cited

U.S. PATENT DOCUMENTS

| | | | |
|---|---|---|---|
| 10,880,322 B1* | 12/2020 | Jakobsson | H04L 51/08 |
| 11,463,533 B1* | 10/2022 | Garber | H04L 67/1097 |
| 11,743,375 B2* | 8/2023 | Christie | G06Q 10/107 |
| | | | 455/412.2 |
| 11,757,914 B1* | 9/2023 | Jakobsson | H04L 51/42 |
| | | | 726/25 |
| 2005/0047389 A1* | 3/2005 | Bond | H04L 65/403 |
| | | | 370/395.52 |
| 2007/0113181 A1* | 5/2007 | Blattner | G06Q 10/107 |
| | | | 715/753 |
| 2007/0270124 A1* | 11/2007 | Johnson | H04L 12/66 |
| | | | 455/406 |
| 2009/0119678 A1* | 5/2009 | Shih | H04L 51/00 |
| | | | 719/313 |
| 2010/0004008 A1* | 1/2010 | Abolrous | H04L 51/18 |
| | | | 455/466 |
| 2011/0294525 A1* | 12/2011 | Jonsson | H04M 1/72439 |
| | | | 345/589 |
| 2012/0096352 A1* | 4/2012 | Maor | A63F 13/12 |
| | | | 715/706 |
| 2012/0124483 A1* | 5/2012 | Zuckerberg | H04L 51/08 |
| | | | 715/752 |
| 2012/0270578 A1 | 10/2012 | Feghali | |
| 2013/0031475 A1* | 1/2013 | Maor | A63F 13/87 |
| | | | 715/706 |
| 2013/0120168 A1* | 5/2013 | Kumar | H03M 7/3059 |
| | | | 341/90 |
| 2014/0143682 A1* | 5/2014 | Druck | G06F 3/016 |
| | | | 715/752 |
| 2014/0282745 A1* | 9/2014 | Chipman | H04N 21/25891 |
| | | | 725/61 |
| 2014/0351720 A1 | 11/2014 | Yin | |
| 2014/0359444 A1* | 12/2014 | Greenberg-Sanders | |
| | | | H04L 65/401 |
| | | | 715/716 |
| 2015/0200881 A1* | 7/2015 | Zheng | H04L 51/08 |
| | | | 345/473 |
| 2015/0281917 A1* | 10/2015 | Weiss | H04M 1/72436 |
| | | | 455/419 |
| 2016/0259526 A1 | 9/2016 | Lee et al. | |
| 2016/0344668 A1* | 11/2016 | Young | H04L 67/306 |
| 2017/0155521 A1* | 6/2017 | Zhang | H04L 51/046 |
| 2018/0004396 A1* | 1/2018 | Ying | H04N 21/47217 |
| 2018/0006976 A1* | 1/2018 | Ye | H04L 51/04 |
| 2018/0188905 A1* | 7/2018 | Tran | G06F 3/0488 |
| 2018/0241702 A1* | 8/2018 | Liu | H04L 51/56 |
| 2018/0255007 A1 | 9/2018 | Ji et al. | |
| 2018/0295092 A1* | 10/2018 | Peiris | G06Q 50/01 |
| 2018/0309703 A1* | 10/2018 | Ihara | H04M 1/72439 |
| 2018/0351903 A1 | 12/2018 | Allen et al. | |
| 2019/0018577 A1 | 1/2019 | Liu | |
| 2019/0164327 A1 | 5/2019 | Liu | |
| 2019/0268289 A1* | 8/2019 | Brown | H04L 63/0245 |
| 2019/0392394 A1 | 12/2019 | Druck | |
| 2020/0249809 A1* | 8/2020 | Xia | G06F 3/0485 |
| 2020/0336454 A1* | 10/2020 | Grantham | H04L 51/52 |
| 2021/0409412 A1* | 12/2021 | Mohamed | H04L 51/224 |
| 2022/0394316 A1* | 12/2022 | Liu | H04L 51/226 |

FOREIGN PATENT DOCUMENTS

| | | |
|---|---|---|
| CN | 109993821 A | 7/2019 |
| CN | 110855544 A | 2/2020 |

OTHER PUBLICATIONS

Extended European Search Report for application No. EP 21809545 3 dated Jul. 6, 2023, 8p.
First Office Action for corresponding Chinese application No. 202010432596.8 dated Sep. 6, 2023, 9p, in Chinese language.
English language translation of the Office Action for corresponding Chinese application No. 202010432596.8, 8p.

* cited by examiner

MESSAGE TRANSMITTING METHOD AND APPARATUS, MESSAGE RECEIVING METHOD AND APPARATUS, DEVICE, AND MEDIUM

RELATED APPLICATION

This application claims priority to PCT/CN2021/088392, filed on Apr. 20, 2021, published as WO2021233038A1, entitled "MESSAGE TRANSMITTING METHOD AND APPARATUS, MESSAGE RECEIVING METHOD AND APPARATUS, DEVICE, AND MEDIUM," which claims priority to Chinese Patent Application No. 202010432596.8 filed on May 20, 2020 and entitled "MESSAGE TRANSMITTING METHOD AND APPARATUS, MESSAGE RECEIVING METHOD AND APPARATUS, DEVICE, AND MEDIUM," each of which are incorporated herein by reference in their entirety.

FIELD OF THE TECHNOLOGY

This application relates to the field of instant messaging, and in particular, to a message transmitting method and apparatus, a message receiving method and apparatus, a device, and a medium.

BACKGROUND OF THE DISCLOSURE

An instant messaging program provides a private chat function and a group chat function. The private chat function is a chat function between two user accounts. The group chat function is a chat function among a plurality of user accounts.

SUMMARY

Embodiments of this application provide a message transmitting method and apparatus, a message receiving method and apparatus, a device, and a medium, which can provide a message exchange manner having a mild reminder function. The technical solutions are as follows.

One embodiment provides a message transmitting method and the method includes: displaying a first chat interface, head portraits of at least two user accounts being displayed in the first chat interface, and the at least two user accounts including the first user account and a second user account; generating an interaction message in response to an interaction with the head portrait of the second user account; and transmitting the interaction message to the second user account, the interaction message being used for triggering displaying of a head portrait animation of the head portrait of the second user account in a second chat interface by a second client, and the second client being logged with the second user account.

Another embodiment provides a message receiving method and the method includes: displaying a second chat interface, head portraits of at least two user accounts being displayed in the second chat interface, and the at least two user accounts including a first user account and the second user account; receiving an interaction message transmitted by the first user account to the second user account; and displaying the interaction message in the second chat interface, and displaying a head portrait animation of the head portrait of the second user account in the second chat interface.

In some embodiments, a message display manner of the interaction message is the same as a message display manner of a system message.

In some embodiments, the message content of the interaction message includes a name of the first user account, a name of the second user account, and a description of an action of the first user account to the second user account.

Another embodiment provides a message transmitting apparatus, the apparatus being logged with a first user account and includes: a display module, configured to display a first chat interface, head portraits of at least two user accounts being displayed in the first chat interface, and the at least two user accounts including the first user account and a second user account; a generation module, configured to generate an interaction message in response to an interaction instruction triggered on the head portrait of the second user account; and a transmitting module, configured to transmit the interaction message to the second user account, the interaction message being used for triggering displaying of a head portrait animation of the head portrait of the second user account in a second chat interface by a second client, and the second client being logged with the second user account.

In some embodiments, the generation module is further configured to generate the interaction message in response to a double-click/tap instruction triggered on the head portrait of the second user account.

In some embodiments, the display module is further configured to display the head portrait animation of the head portrait of the second user account in the first chat interface in response to the interaction instruction triggered on the head portrait of the second user account.

In some embodiments, a plurality of head portraits of the second user account are displayed in the first chat interface. The display module is further configured to display a head portrait animation of any one of the head portraits of the second user account in a head portrait area corresponding to the head portrait in response to the double-click/tap instruction triggered on the head portrait.

In some embodiments, the display module is further configured to display the interaction message in the first chat interface.

In some embodiments, the display module is further configured to display message content of the interaction message in the first chat interface, a message display manner of the interaction message being different from a message display manner of a chat message.

In some embodiments, the message display manner of the interaction message is the same as a message display manner of a system message.

In some embodiments, the display module is configured to automatically scroll to a last message in the first chat interface in response to displayed content in the first chat interface not including the last message, the last message including the message content of the interaction message.

In some embodiments, the message content includes a name of the first user account, a name of the second user account, and a description of an action of the first user account to the second user account, the names including at least one of a remark name, a group nickname, or a customized nickname.

In some embodiments, the description of the action is description related to at least one of the following actions: touch, tickle, hammer, hit, kick, slash, or kiss.

In some embodiments, the display module is configured to: display an attribute page of the first user account in response to a first trigger instruction on the name of the first user account; or display an attribute page of the second user account in response to a second trigger instruction on the name of the second user account.

In some embodiments, the display module is configured to: display all or some of n consecutive interaction messages in a collapsed form in response to the n interaction messages existing in the first chat interface and the n interaction messages all being in a read state; or display all or some of m consecutive interaction messages in a collapsed form in response to the m interaction messages existing in the first chat interface and the m interaction messages all being prior to a last non-interaction message, m being an integer greater than 1, and the non-interaction message being a message other than the interaction messages.

Another embodiment provides a message receiving apparatus, the apparatus being logged with a second user account and includes: a display module, configured to display a second chat interface, head portraits of at least two user accounts being displayed in the second chat interface, and the at least two user accounts including a first user account and the second user account; and a receiving module, configured to receive an interaction message transmitted by the first user account to the second user account.

The display module is configured to display the interaction message in the second chat interface, and display a head portrait animation of the head portrait of the second user account in the second chat interface.

In some embodiments, the display module is further configured to display message content of the interaction message in the second chat interface, a message display manner of the interaction message being different from a message display manner of a chat message.

In some embodiments, the display module is further configured to display the head portrait animation of the head portrait of the second user account in a head portrait area corresponding to a chat message transmitted by the second user account and closest to the interaction message.

In some embodiments, the display module is further configured to: display all or some of n consecutive interaction messages in a collapsed form in response to the n interaction messages existing in the second chat interface and the n interaction messages all being in a read state; or display all or some of m consecutive interaction messages in a collapsed form in response to the m interaction messages existing in the second chat interface and the m interaction messages all being prior to a last non-interaction message.

Another embodiment provides a computer device, including a processor and a memory, the memory storing at least one instruction, at least one program, a code set, or an instruction set, the at least one instruction, the at least one program, the code set, or the instruction set being loaded and executed by the processor to implement the message transmitting method or the message receiving method described in the foregoing embodiment(s).

Another embodiment provides a non-transitory computer-readable storage medium, storing at least one instruction, at least one program, a code set, or an instruction set, the at least one instruction, the at least one program, the code set, or the instruction set being loaded and executed by a processor to implement the message transmitting method or the message receiving method described in the foregoing embodiment(s).

The technical solutions provided in the embodiments of this application may enable new interactions between users, reduce human-computer interaction operations, and/or enhance operational efficiency and interaction efficiency.

The interaction message is transmitted to the second user account in response to the interaction instruction triggered on the head portrait of the second user account. The interaction message is used for triggering displaying of the head portrait animation of the head portrait of the second user account in the second chat interface by the second client. Therefore, a new interaction manner having a mild reminder function is provided. The new interaction manner is applicable to interesting interaction in chat scenarios having a relaxed and pleasant atmosphere. In addition, a user can interact with other user accounts merely by triggering the interaction instruction on the head portrait. Therefore, redundant human-computer interaction operations are reduced, an operation process can be simplified, and operation efficiency and interaction efficiency can be enhanced.

BRIEF DESCRIPTION OF THE DRAWINGS

To describe the technical solutions in the embodiments of this application more clearly, the accompanying drawings required for describing the embodiments are briefly described hereinafter. The accompanying drawings in the following descriptions show merely some embodiments of this application, and a person of ordinary skill in the art may understand other embodiments according to these accompanying drawings without creative efforts.

DESCRIPTION OF EMBODIMENTS

To make objectives, technical solutions, and advantages of this application clearer, the following further describes implementations of this application in detail with reference to the accompanying drawings.

Figure 1:
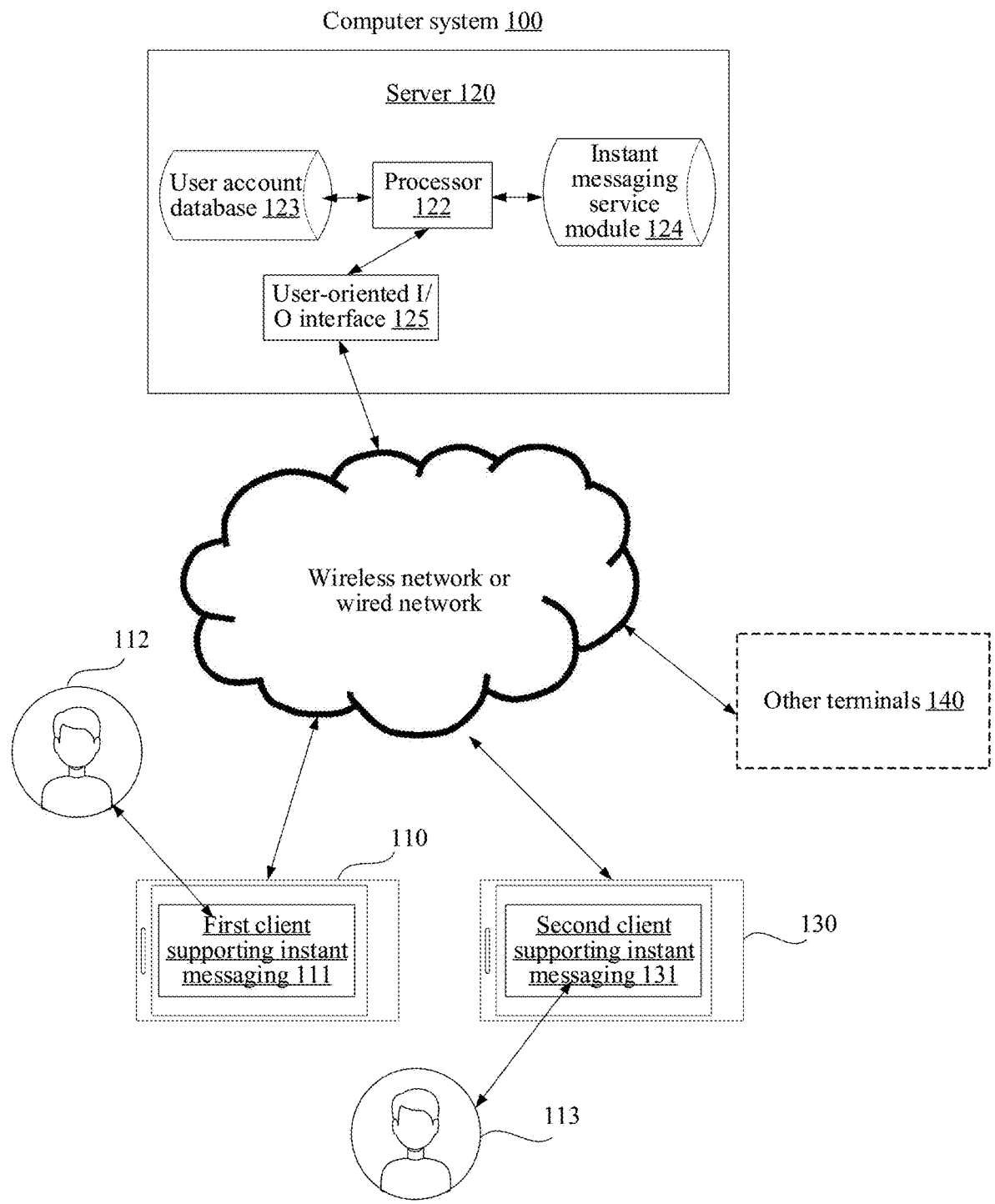
FIG. 1 is a structural block diagram of a computer system according to one example embodiment.

FIG. 1 is a structural block diagram of a computer system according to an example embodiment of this application. The computer system 100 includes a first terminal 110, a server 120, and a second terminal 130.

A first client 111 supporting instant messaging is installed and executed on the first terminal 110. In some embodiments, the first client 111 is an application or a webpage client having an instant messaging function. When the first terminal 110 executes the first client 111, a user interface (UI) of the first client 111 is displayed on a screen of the first terminal 110. In some embodiments, the application is any one of an instant messaging application, a microblog application, a voice communication application, a conference application, a network community application, a payment application, a shopping application, a friend-making application, or a match-making application. In this embodiment of this application, the application being the instant messaging application is used as an example. The first terminal 110 is a terminal used by a first user 112. The first client 111 is logged with a first user account of the first user 112.

A second client 131 supporting instant messaging is installed and executed on the second terminal 130. In some embodiments, the second client 131 is an application or a webpage client having an instant messaging function. When the second terminal 130 executes the second client 131, a UI of the second client 131 is displayed on a screen of the second terminal 130. In some embodiments, the application is any one of an instant messaging application, a microblog application, a voice communication application, a conference application, a network community application, a payment application, a shopping application, a friend-making application, a match-making application, or a game application. In this embodiment of this application, the application being the instant messaging application is used as an example. The second terminal 130 is a terminal used by a second user 132. The second client 131 is logged with a second user account of the second user 132.

In some embodiments, the application installed on the first terminal 110 is same as the application installed on the second terminal 130, or the applications installed on the two terminals are applications of a same type on different operating system platforms (such as Android or IOS). For example, the application is the game program. The first user account is used to control a first virtual character. The second user account is used to control a second virtual character. The first virtual character and the second virtual character are in a same virtual environment. In some embodiments, the first virtual character and the second virtual character may belong to a same camp, a same team, a same organization, a same lobby, or a same channel, or have a friend relationship. Alternatively, the first virtual character and the second virtual character have a temporary communication permission. In some embodiments, the first virtual character and the second virtual character may belong to different camps, different teams, different organizations, different lobbies, or different channels, or have a hostile relationship.

In some embodiments, the application installed on the first terminal 110 is same as the application installed on the second terminal 130, or the applications installed on the two terminals are applications of a same type on different operating system platforms (such as Android or IOS). The first terminal 110 is one of a plurality of terminals, and the second terminal 130 is one of a plurality of terminals. In this embodiment, only the first terminal 110 and the second terminal 130 are used as an example for description. Device types of the first terminal 110 and the second terminal 130 are the same or different. The device types include at least one of a smartphone, a tablet computer, an e-book reader, an MP3 player, an MP4 player, a laptop portable computer, or a desktop computer.

FIG. 1 shows only two terminals. However, in a different embodiment, a plurality of other terminals 140 exist and may be connected the server 120. In some embodiments, one or more terminals 140 corresponding to a developer exist. A development and editing platform of a client supporting instant messaging is installed on the terminal 140. The developer may edit and update the client on the terminal 140, and transmit an installation package of the updated client to the server 120 by means of a wired or wireless network. The first terminal 110 and the second terminal 130 may download the application installation package from the server 120 to update the clients.

The first terminal 110, the second terminal 130, and the other terminals 140 are connected to the server 120 by means of the wired or wireless network.

The server 120 includes at least one of one server, a plurality of servers, a cloud computing platform, or a virtualization center. The server 120 is configured to provide a background service for a client supporting three-dimensional instant messaging. In some embodiments, the server 120 is in charge of primary computing, and the terminals are in charge of secondary computing. Alternatively, the server 120 is in charge of the secondary computing, and the terminals are in charge of the primary computing. Alternatively, the server 120 and the terminal perform collaborative computing based on a distributed computing architecture.

In one example, the server 120 includes a processor 122, a user account database (DB) 123, an instant messaging service module 124, and a user-oriented input/output interface (I/O interface) 125. The processor 122 is configured to load an instruction stored in the server 120 to process data in the user account DB 123 and the instant messaging service module 124. The user account DB 123 is configured to store data of user accounts used by the first terminal 110, the second terminal 130, and the other terminals 140, for example, head portraits of the user accounts, nicknames of the user accounts, and groups where the user accounts are located. The instant messaging service module 124 is configured to provide a plurality of chat rooms (private chat or group chat) for the user to perform instant messaging such as chatting, transmitting emoji, and creating red packets. The user-oriented I/O interface 125 is configured to establish communication with the first terminal 110 by means of the wireless network or the wired network to exchange data, or establish communication with the second terminal 130 to exchange data.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

A message transmitting (or receiving) method in the embodiments of this application is described with reference to the above implementation environment. An execution subject of the method being the client executed on the terminal shown in FIG. 1 is used as an example for description. The client is executed on the terminal. The client is an application supporting instant messaging.

Figure 2:
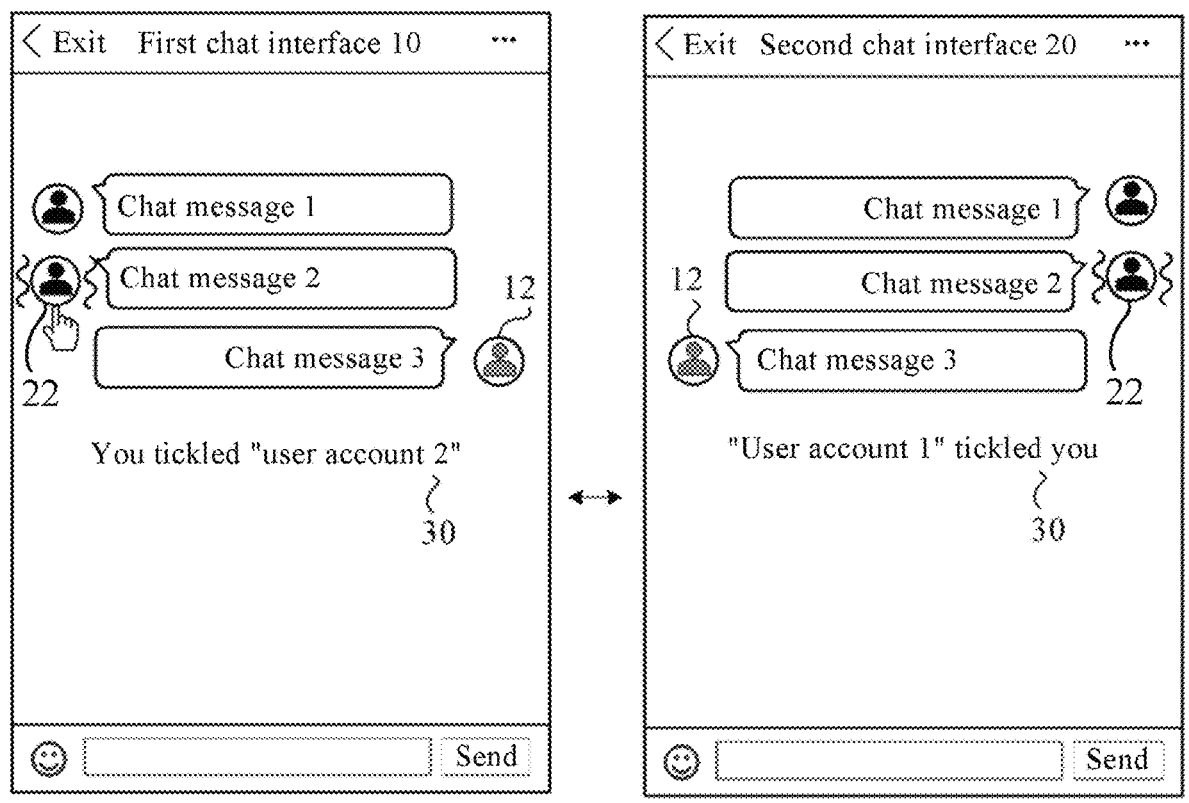
FIG. 2 is a schematic diagram of an interface of an interaction message according to one example embodiment.

FIG. 2 shows a first chat interface 10 of the first client 111 and a second chat interface 20 of the second client 131. The first client 111 is logged with the first user account, and the second client 131 is logged with the second user account. The first user account and the second user account can achieve transmission and receipt of chat messages in the private chat or the group chat. A head portrait 12 and chat messages of the first user account and a head portrait 22 and chat messages of the second user account are respectively displayed on the first chat interface 10 and the second chat interface 20.

When a first user performs double click/tap on the head portrait 22 of the second user account, the head portrait 22 of the second user account displays a head portrait animation. Meanwhile, an interaction message 30 is displayed in the first chat interface 10 and the second chat interface 20. The interaction message 30 is a message different from the chat message. In some embodiments, message content of the interaction message 30 is voluntarily assembled by the client. In the first chat interface 10, the message content of the interaction message 30 is: you tickled "user account 2". The user account 2 is a name of the second user account. In the second chat interface 20, the message content of the interaction message 30 is: "user account 1" tickled you. The "user account 1" is a name of the first user account.

Figure 3:
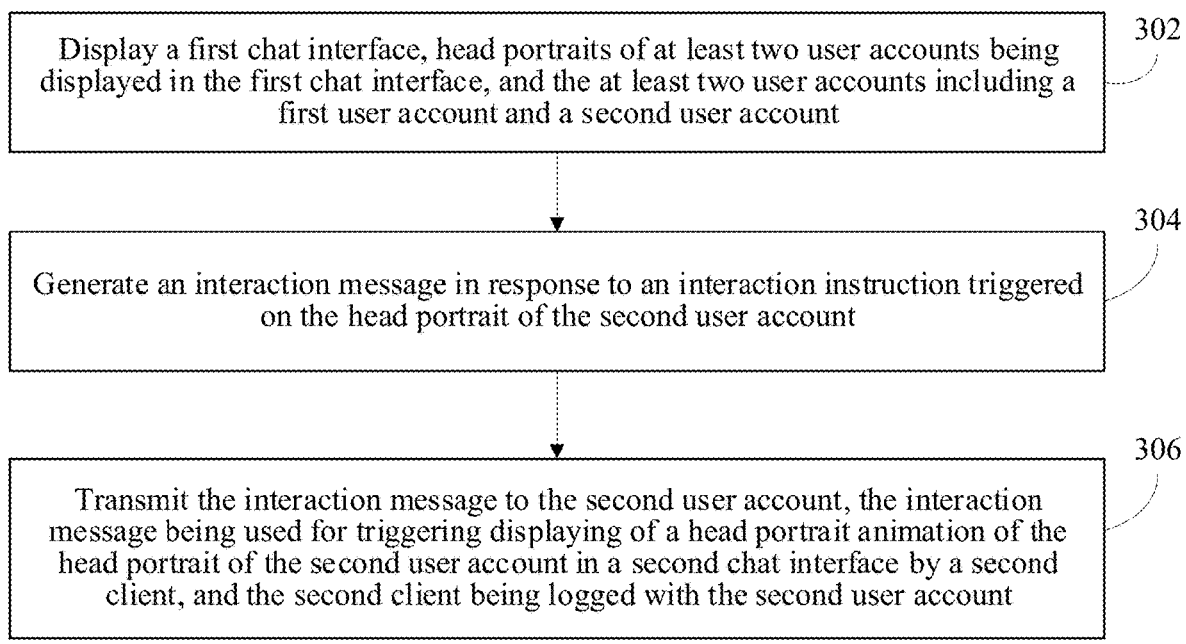
FIG. 3 is a method flowchart of a message transmitting method according to one example embodiment.

FIG. 3 is a flowchart of a message transmitting method according to one example embodiment of this application. In this embodiment of this application, the method being performed by the first client shown in FIG. 1 is used as an example for description. The first client is logged with a first user account. The method includes the following steps:

Step 302: Display a first chat interface, head portraits of at least two user accounts being displayed in the first chat interface, and the at least two user accounts including the first user account and a second user account.

The first chat interface is a chat interface of a private chat or a group chat. A list of chat messages sorted according to a timeline is displayed in the first chat interface. In each chat message in the chat message list, a head portrait of a user account as a transmitter and message content of the chat message are displayed. In some embodiments, each chat message further displays a remark name, a group nickname, or a customized nickname of the user account. The remark name is a name remarked for a current user account by another user account. The group nickname is a nickname customized by the current user account in a group. The customized nickname is a nickname customized by the current user account in the client.

For example, the first chat interface is a chat interface of the group chat. The group includes at least two user accounts. The at least two user accounts include the first user account, the second user account, and other user accounts.

Step 304: Generate an interaction message in response to an interaction instruction triggered on the head portrait of the second user account.

The first user performs a trigger operation on the head portrait of the second user account. The trigger operation includes at least one of a double-click/tap operation, a click/tap operation, or a touch and hold operation. After receiving the triggering operation, the first client triggers generation of the interaction instruction to generate the interaction message according to the first user account and the second user account. In this embodiment of this application, the interaction instruction may be referred to as an interaction and may include a double-click/tap instruction in some embodiments.

The interaction message is a message type different from the chat message. In some embodiments, the interaction message is implemented in a system message format, or is implemented in a customized message format. For example, the interaction instruction is a light interaction instruction, and the interaction message is a light interaction message.

Step 306: Transmit the interaction message to the second user account, the interaction message being used for triggering displaying of a head portrait animation of the head portrait of the second user account in a second chat interface by a second client, and the second client being logged with the second user account.

In some embodiments, the interaction message not only triggers displaying of the head portrait animation of the head portrait of the second user account in the second chat interface by the second client, but also triggers displaying of the interaction message in the second chat interface by the second client.

In conclusion, according to the method provided in this embodiment of this application, the interaction message is transmitted to the second user account in response to the interaction instruction triggered on the head portrait of the second user account. The interaction message is used for triggering displaying of the head portrait animation of the head portrait of the second user account in the second chat interface by the second client. Therefore, a new interaction manner having a mild reminder function is provided. The new interaction manner is applicable to interesting interaction in chat scenarios having relaxed and pleasant atmosphere. In addition, the user can interact with other user accounts merely by triggering the interaction instruction on the head portrait. Therefore, redundant human-computer interaction operations are reduced, an operation process can be simplified, and operation efficiency and interaction efficiency can be enhanced.

Figure 4:
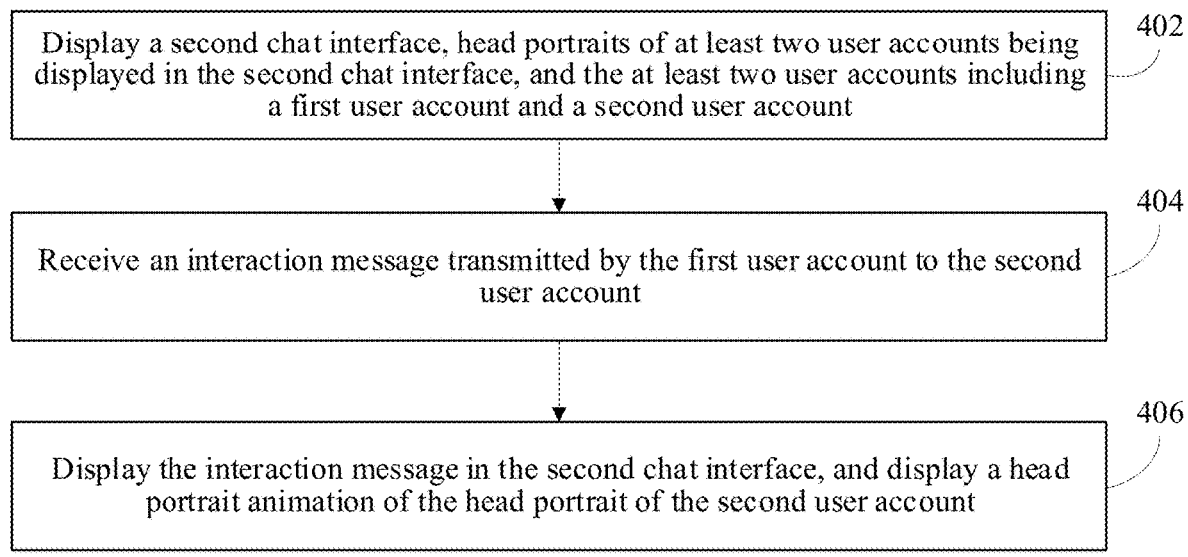
FIG. 4 is a method flowchart of a message receiving method according to one example embodiment.

FIG. 4 is a flowchart of a message receiving method according to one example embodiment of this application. In this embodiment of this application, the method being performed by the second client shown in FIG. 1 is used as an example for description. The second client is logged with a second user account. The method includes the following steps:

Step 402: Display a second chat interface, head portraits of at least two user accounts being displayed in the second chat interface, and the at least two user accounts including a first user account and the second user account.

The second chat interface is a chat interface of a private chat or a group chat. A list of chat messages sorted according to a timeline is displayed in the second chat interface. In each chat message in the chat message list, a head portrait of a user account as a transmitter and message content of the chat message are displayed. In some embodiments, each chat message further displays a remark name, a group nickname, or a customized nickname of the user account. The remark name is a name remarked for a current user account by another user account. The group nickname is a nickname customized by the current user account in a group. The customized nickname is a nickname customized by the current user account in the client.

For example, the second chat interface is a chat interface of the group chat. The group includes at least two user accounts. The at least two user accounts include the first user account, the second user account, and other user accounts.

Step 404: Receive an interaction message transmitted by the first user account to the second user account.

The second client receives the interaction message transmitted by the first user account to the second user account. The interaction message is a message type different from the chat message. In some embodiments, the interaction message is implemented in a system message format, or is implemented in a customized message format. In some embodiments, the interaction message is a light interaction message.

In some embodiments, the second client receives the interaction message transmitted by a server. The first user account transmits the interaction message to the server and requests the server to forward the interaction message to the second user account.

Step 406: Display the interaction message in the second chat interface, and display a head portrait animation of the head portrait of the second user account.

In some embodiments, the interaction message not only triggers displaying of the head portrait animation of the head portrait of the second user account in the second chat interface by the second client, but also triggers displaying of the interaction message in the second chat interface by the second client.

In conclusion, according to the method provided in this embodiment of this application, when receiving the interaction message transmitted by the first user account to the second user account, the second client displays the head portrait animation of the head portrait of the second user account and the interaction message in the second chat interface. Therefore, a new interaction manner having a mild reminder function is provided. The new interaction manner is applicable to interesting interaction in chat scenarios having relaxed and pleasant atmosphere.

Figure 5:
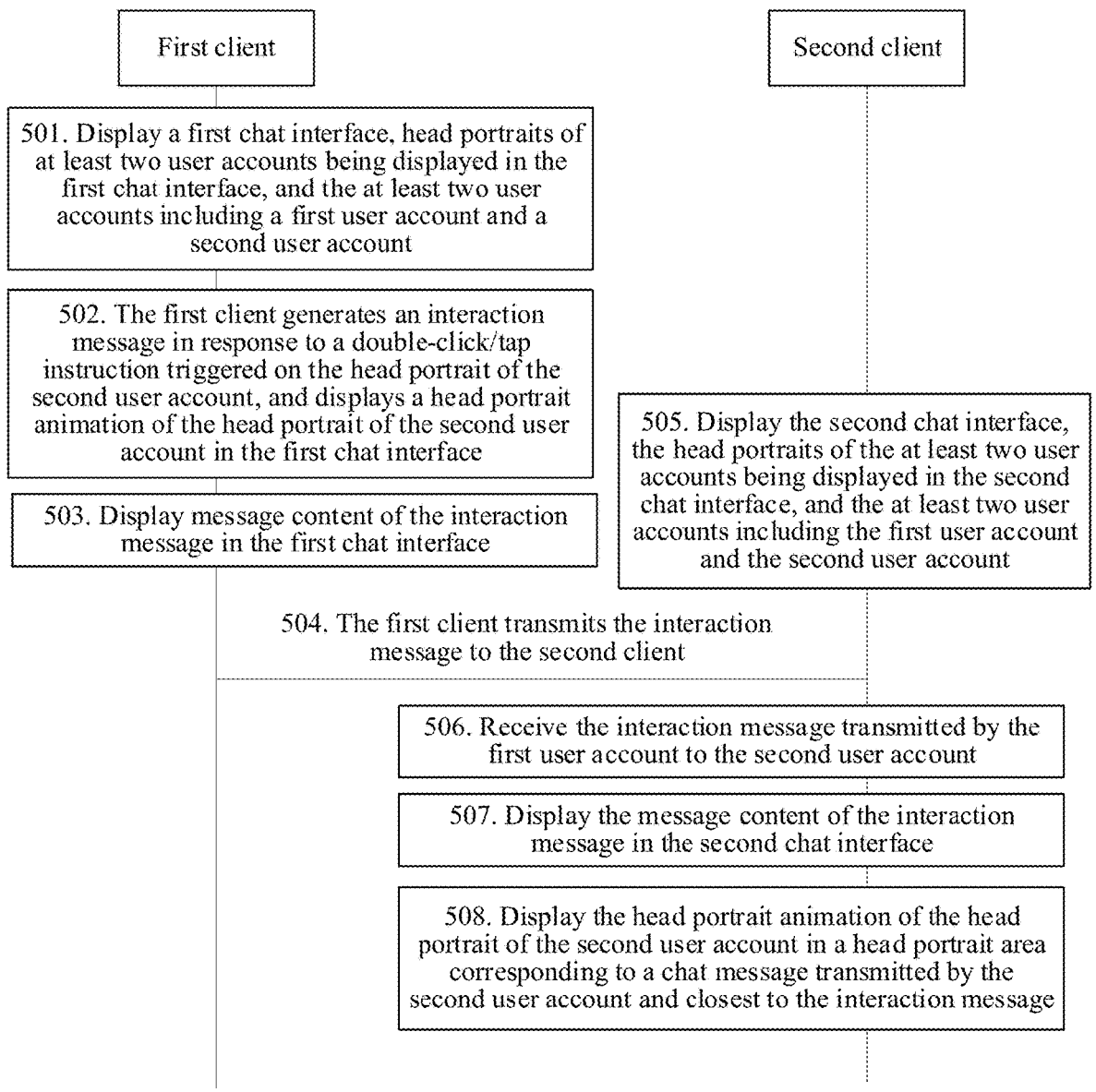
FIG. 5 is a method flowchart of a message transmitting/receiving method according to one example embodiment.

FIG. 5 is a flowchart of a message transmitting/receiving method according to one example embodiment of this application. In this embodiment of this application, the method being performed by the first client and the second client shown in FIG. 1 is used as an example for description. The method includes the following steps:

Step 501: The first client displays a first chat interface, head portraits of at least two user accounts being displayed in the first chat interface, and the at least two user accounts including a first user account and a second user account.

The first chat interface is a chat interface of a private chat or a group chat. A list of chat messages sorted according to a timeline is displayed in the first chat interface.

Step 502: The first client generates an interaction message in response to a double-click/tap instruction triggered on the head portrait of the second user account, and displays a head portrait animation of the head portrait of the second user account in the first chat interface.

A first user performs a double-click/tap operation on the head portrait of the second user account. After receiving the double-click/tap operation, the first client triggers and generates the double-click/tap instruction. The first client generates the interaction message according to the first user account and the second user account in response to the double-click/tap instruction. In this embodiment of this application, the interaction instruction being a double-click/tap instruction is used as an example for description.

The interaction message is a message type different from the chat message. For example, the interaction message is the light interaction message. In some embodiments, the interaction message is implemented by in a system message format. In some embodiments, the system message carries the first user account and the second user account. Alternatively, the system message carries the first user account, the second user account, and an interaction identifier. The interaction identifier is an identifier used for representing that a message type is the interaction message. Alternatively, the system message further carries an action identifier. The action identifier is an identifier used for representing an action of the first user account to the second user account.

In some embodiments, the interaction message carries the first user account and the second user account. Alternatively, the interaction message further carries an interaction identifier. Alternatively, the interaction message further carries an action identifier.

In some embodiments, the first client further displays the head portrait animation of the head portrait of the second user account in the first chat interface. The head portrait animation is an animation displayed based on the head portrait of the second user account. For example, the head portrait animation includes, but is not limited to, at least one of the following: an animation for shaking the head portrait of the second user account, an animation for rotating the head portrait of the second user account, an animation for superposing a filter to the head portrait of the second user account, an animation for superposing other display elements (for example, a human hand) to the head portrait of the second user account, or an animation for zooming out or zooming in the head portrait of the second user account.

In this embodiment of this application, the head portrait animation being the animation for shaking the head portrait of the second user account is used as an example for description.

In some embodiments, the first chat interface includes a plurality of head portraits of the second user account. A head portrait animation of any one of the head portraits of the second user account is displayed in a head portrait area corresponding to the head portrait in response to the double-click/tap instruction triggered on the head portrait. For example, each time the second user account transmits a chat message, the chat message and the head portrait of the second user account are both displayed in the first chat interface. Therefore, the first user can perform the double-click/tap operation on any one of the head portraits of the second user account. In this way, the double-click/tap instruction is triggered, and the head portrait animation of the head portrait is displayed in the head portrait area corresponding to the head portrait.

Step 503: The first client displays the interaction message in the first chat interface.

In some embodiments, the first client displays message content of the interaction message in the first chat interface. A message display manner of the interaction message is different from a message display manner of the chat message. For example, the message display manner of the interaction message may be in a text form, while the message display manner of the chat message may be in a bubble form. That is to say, the interaction message is not displayed in the bubble form. Instead, the interaction message is displayed by using a message display manner of the system message.

In some embodiments, the message content of the interaction message is voluntarily assembled by the first client. For example, the message content of the interaction message is: you tickled "user account 2". Forwarding of the interaction message on a server side is delayed. In order to avoid the delay, the message content of the interaction message is assembled and displayed by the first client. For example, the interaction message carries the first user account, the second user account, and the action identifier. The action identifier is the identifier used for representing an action of the first user account to the second user account. The first client assembles the message content of the interaction message according to the first user account, the second user account, and the action identifier in the interaction message. For example, the assembled message content of the interaction message includes a name of the first user account, a name of the second user account, and a description of the action of the first user account to the second user account.

In some embodiments, the message content of the interaction message is assembled by the server. The first client transmits the interaction message to the server. The server assembles the message content of the interaction message after receiving the interaction message, and transmits the message content of the interaction message to the first user account of the first client and the second user account of the second client.

Figure 6:
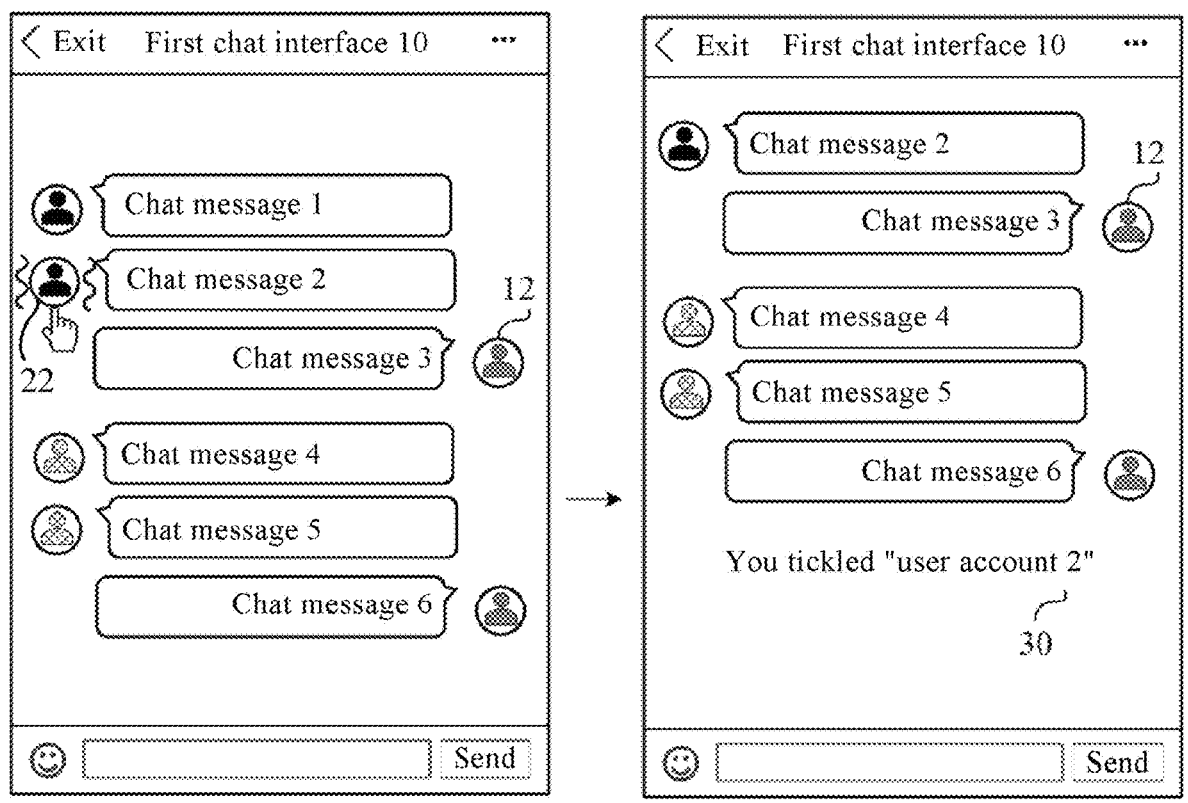
FIG. 6 is a schematic diagram of an interface of the message transmitting/receiving method according to one example embodiment.

In some embodiments, since the head portrait of the second user account can be displayed at any position in the chat message list, the head portrait of the second user account clicked/tapped by the first user is located in the middle of the chat message list. Accordingly, the method may include automatically scrolling to a last message in the first chat interface in response to displayed content in the first chat interface not including the last message, the last message including the message content of the interaction message. As shown in FIG. 6, the first chat interface 10 includes a head portrait 12 of the first user account and a head portrait 22 of the second user account. After the first user performs a double-click/tap operation on the head portrait 22 of the second user account, the head portrait 22 of the second user account displays a shaking animation. However, a chat message 2 is located in the front, and content displayed at a bottom of the chat message list cannot be displayed in the first chat interface 10. Therefore, the first chat interface 10 automatically scrolls to a last message in the first chat interface. The last message includes an interaction message 30: you tickled "user account 2". The user account 2 is the name of the second user account. In this way, the first user timely learns that the interaction message 30 has been successfully triggered, thereby preventing the user from continuously performing double-click/tap operations on the head portrait 22 of the second user account a plurality of times when the user does not obtain the feedback.

The last message is the last message received in the first chat interface. Some of the messages in the chat message list are displayed in the first chat interface. By swiping the chat message list in the first chat interface up and down, the messages in the chat message list displayed in the first chat interface can be changed. The last message is located in a bottom area of the chat message list. If the content displayed in the first chat interface does not include the content in the bottom area of the chat message list, the first chat interface does not include the last message.

In some embodiments, since the chat messages are sorted according to a timeline, displayed content of the latest message is displayed in the bottom display area of the first chat interface.

In some embodiments, the message content of the interaction message includes the name of the first user account, the name of the second user account, and the description of the action of the first user account to the second user account. The names include at least one of a remark name, a group nickname, or a customized nickname. The description of the action includes, but is not limited to, description related to at least one of the following actions: touching, touch, tickle, hammer, hit, kick, slash, kiss, or push. For example, the message content of the interaction message may be: "name of the first user account" tickled "name of the second user account", or "name of the first user account" pushed "name of the second user account".

For example, a priority of the remark name is superior than a priority of the group nickname, and the priority of the group nickname is superior than a priority of the customized nickname. Thus, when there is a remark name, the remark name is preferentially displayed. When there is no remark name but a group nickname, the group nickname in a current group is preferentially displayed. And when there is no remark name and group nickname, the customized nickname is displayed.

For example, since the first user account is an account that is logged in the first client, in the first client, "you" may be used as the remark name of the first user account.

Step 504: The first client transmits the interaction message to the second client.

The first client transmits the interaction message to the second client by using a server. In some embodiments, the first client transmits the interaction message to the server in a system message format (or a newly defined message format). If the server verifies that the interaction message meets a transmission condition, the server transmits the interaction message to all user accounts in the chat interface. When the chat interface is a private chat interface, the server transmits the interaction message to the first user account and the second user account. When the chat interface is a group chat interface, the server transmits the interaction message to the first user account, the second user account, and the other user accounts.

In some embodiments, the transmission condition includes a condition for limiting a transmitting frequency. The transmission condition includes, but is not limited to, at least one of the transmission conditions:

Condition 1: A quantity of times the first user account transmits the interaction message to the second user account within a time period A does not exceed x. For example, a quantity of times the interaction message is transmitted to a same account within two seconds does not exceed 1.

Condition 2: A quantity of times all user accounts in a same group transmit the interaction message within a time period B does not exceed y. For example, a quantity of times all of the user accounts in a same group transmit the interaction message within ten seconds does not exceed 30.

In some embodiments, the transmission condition includes an association relationship between the first user account and the second user account. The association relationship between the first user account and the second user account means that the first user account and the second user account are friends. For example, if the first user account is not a friend of the second user account, the first user account is not allowed to transmit the interaction message to the second user account.

If the interaction message transmitted by the first client does not meet the transmission condition, the server transmits a failure prompt to the first client. For example, the failure prompt may be "Do not transmit the tickle message frequently".

Step 505: The second client displays a second chat interface, the head portraits of the at least two user accounts being displayed in the second chat interface, and the at least two user accounts including the first user account and the second user account.

The second chat interface is a chat interface of a private chat or a group chat. A list of chat messages sorted according to a timeline is displayed in the second chat interface.

The first chat interface and the second chat interface are interface representations on two clients logged with different user accounts in a same chat room (a private chat or a group chat).

In the private chat scenario, the first chat interface and the second chat interface are both a chat interface between the first user account and the second user account. In the group chat scenario, a group corresponding to the first chat interface is same as a group corresponding to the second chat interface. The first chat interface is an interface in the first client, and the first client is logged with the first user account. In some embodiments, the first client displays the message transmitted by the first user account on a right side of the first chat interface, and displays, on a left side of the first chat interface, messages transmitted by the user accounts other than the first user account. The second chat interface is an interface in the second client, and the second client is logged with the second user account. In some embodiments, the second client displays the message transmitted by the second user account on a right side of the second chat interface, and displays, on a left side of the second chat interface, messages transmitted by the user accounts other than the second user account.

Step 506: The second client receives the interaction message transmitted by the first user account to the second user account.

The second client receives the interaction message forwarded by the server. The interaction message is encapsulated in the system message format. In some embodiments, the interaction message includes the first user account, the second user account, and the interaction identifier. The interaction identifier is the identifier used for representing that the message type is the interaction message.

For example, the message display manner of the interaction message may be in a text form. The message display manner of the chat message may be in a bubble form. That is to say, the interaction message is not displayed in the bubble form. Instead, the interaction message is displayed by using a message display manner of the system message.

In some embodiments, the message content of the interaction message is assembled by the second client, for example, "user account 1" tickled you. In some embodiments, the message content of the interaction message is assembled by the server, and the second client receives the message content of the interaction message forwarded by the server.

In some embodiments, the message content of the interaction message includes the name of the first user account, the name of the second user account, and the description of the action of the first user account to the second user account. The names include at least one of a remark name, a group nickname, or a customized nickname. The description of the action includes, but is not limited to, description related to at least one of the following actions: touching, touch, tickle, hammer, hit, kick, slash, kiss, or push. For example, the message content of the interaction message may be: the first user account tickled the second user account, or the first user account pushed the second user account.

Step 507: The second client displays message content of the interaction message in the second chat interface.

In some embodiments, the second client displays the message content of the interaction message in the second chat interface. A message display manner of the interaction message is different from a message display manner of the chat message. The second chat interface includes a list of chat messages sorted according to a timeline. The second client further displays the message content of the interaction message at a bottom of the chat message list in the second chat interface.

Step 508: The second client displays the head portrait animation of the head portrait of the second user account in a head portrait area corresponding to a chat message transmitted by the second user account and closest to the interaction message.

The head portrait animation is an animation displayed based on the head portrait of the second user account. For example, the head portrait animation includes, but is not limited to, at least one of the following: an animation for shaking the head portrait of the second user account, an animation for rotating the head portrait of the second user account, an animation for superposing a filter to the head portrait of the second user account, an animation for superposing other display elements (for example, a human hand) to the head portrait of the second user account, or an animation for zooming out or zooming in the head portrait of the second user account.

In some embodiments, the head portrait animation of the head portrait of the second user account is an animation associated with the action description in the message content of the interaction message, such as tickling the head portrait of the second user account or touching the head portrait of the second user account.

Since a distance exists between the message content of the interaction message and the head portrait of the second user account, the second client first determines the chat message in chat messages transmitted by the second user account closest to the interaction message, and then displays the head portrait animation on a head portrait of the second user account corresponding to the closest chat message.

Figure 7:
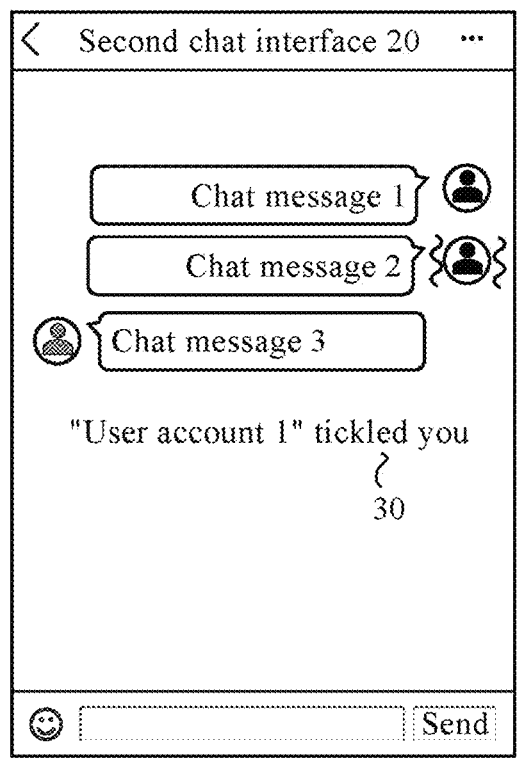
FIG. 7 is a schematic diagram of an interface of the message transmitting/receiving method according to one example embodiment.

As shown in FIG. 7, if it is determined that the chat message in the chat messages transmitted by the second user account closest to the interaction message 30 is the previous chat message 2, the second client displays a shaking animation on the head portrait of the second user account in the previous chat message 2.

Figure 8:
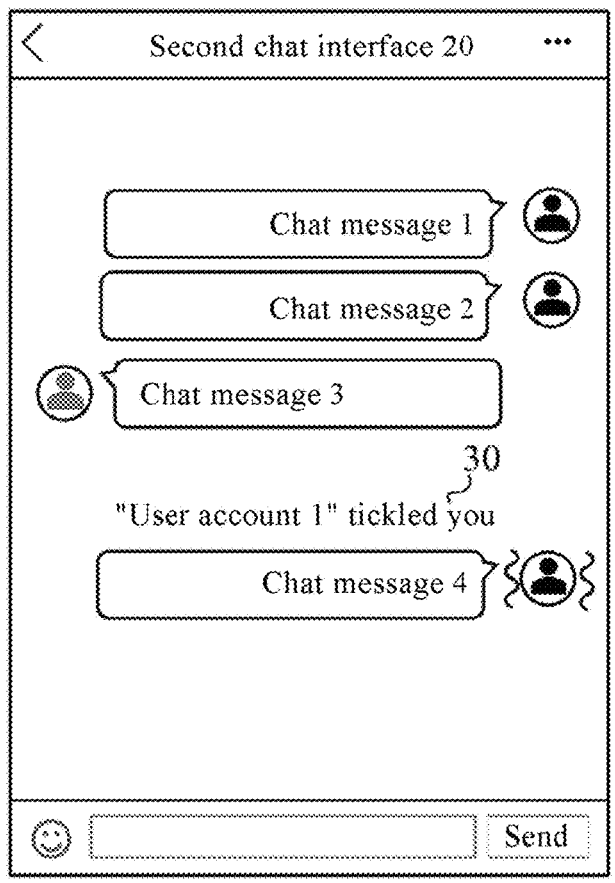
FIG. 8 is a schematic diagram of an interface of the message transmitting/receiving method according to one example embodiment.

As shown in FIG. 8, if it is determined that the chat message in the chat messages transmitted by the second user account closest to the interaction message 30 is a posterior chat message 4, the second client displays a shaking animation on the head portrait of the second user account in the posterior chat message 4.

In some embodiments, if a distance between the previous chat message 2 and the interaction message 30 is the same as a distance between the posterior chat message 4 and the interaction message, the previous chat message 2 is preferentially selected. A distance between two messages is measured by a quantity of messages between the two messages.

Step 507 may be performed before step 508, or may be performed after step 508. Alternatively, step 507 and step 508 may be performed simultaneously.

In some embodiments, the user accounts other than the first user account and the second user account also receive the interaction message. Other clients logged with the other user accounts voluntarily encapsulate the message content of the interaction message for display. The other clients may or may not display the shaking animation of the head portrait of the second user account.

The second user account may be the first user account. That is to say, a user may transmit the interaction message to the user, to trigger displaying of the message content of the interaction message: you tickled yourself.

In the related art, a group chat function is used as an example. When a user account A expects to interact with a user account B, the user account A may transmit a group chat message: "@user account B". Accordingly, the user account B receives a strong reminder and views the group chat message. "@user account B" brings a strong reminder. However, such strong reminder function is improper in some scenarios.

In conclusion, according to the method provided in this embodiment of this application, the interaction message is transmitted to the second user account in response to the interaction instruction triggered on the head portrait of the second user account. The interaction message is used for triggering displaying of the head portrait animation of the head portrait of the second user account in the second chat interface by the second client. Therefore, a new interaction manner having a mild reminder function is provided. The new interaction manner is applicable to interesting interaction in chat scenarios having relaxed and pleasant atmosphere.

In this embodiment of this application, the interaction message is a mild interaction message. Since the mild interaction message is a message simulating a user behavior instead of a message having message content customized by the user, the user may use the mild interaction message to express a slight interaction willingness in some scenarios where the user does not want to say, does not know what to say, or wants to express obscure meanings.

In addition, the user can interact with other user accounts merely by triggering the interaction instruction on the head portrait. Therefore, redundant human-computer interaction operations are reduced, an operation process can be simplified, and operation efficiency and interaction efficiency can be enhanced.

Figure 9:
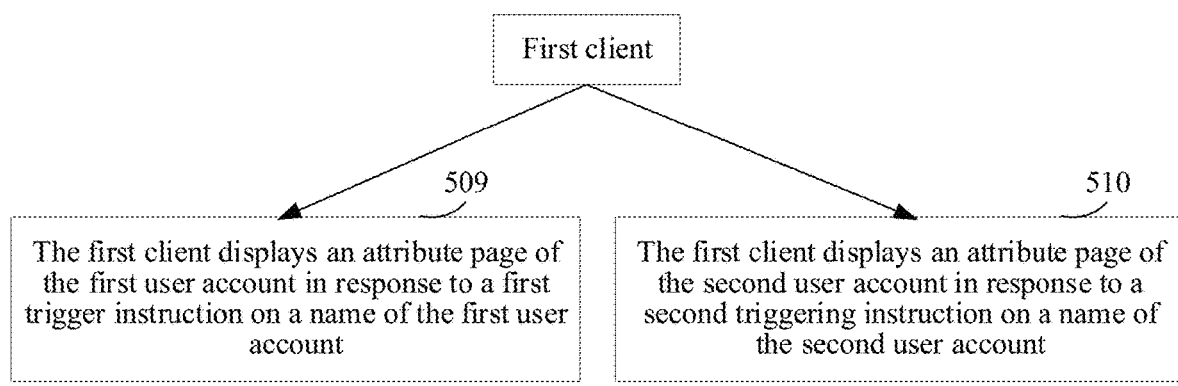
FIG. 9 is a flowchart of a message transmitting/receiving method according to one example embodiment.

In an example embodiment based on FIG. 5, the method further includes step 509 or step 510, as shown in FIG. 9.

Step 509: The first client displays a character attribute page of the first user account in response to a first trigger instruction on the name of the first user account.

Figure 10:
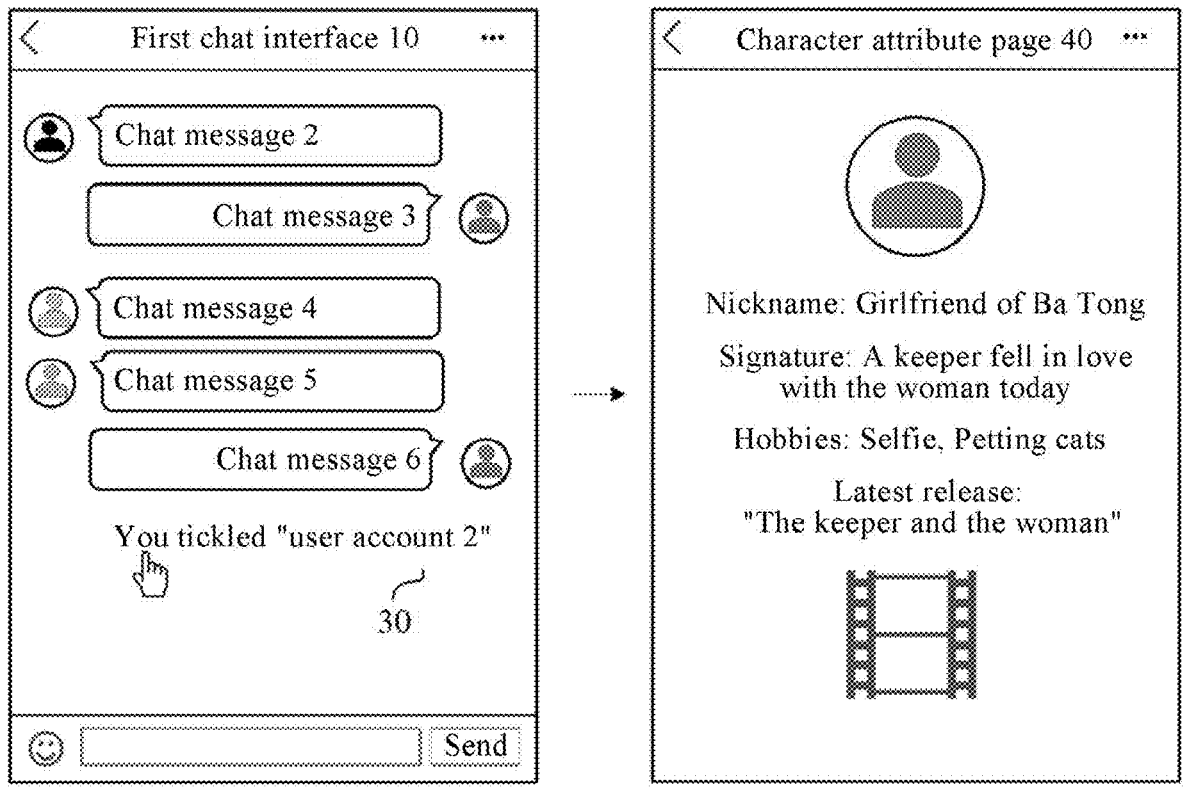
FIG. 10 is a schematic diagram of an interface of a character attribute page according to one example embodiment.

The interaction message includes the names of the two user accounts. When the user clicks/taps the name of the first user account in the interaction message, the first trigger instruction is triggered on the first client. The first client displays an attribute page of the first user account according to the first trigger instruction. As shown in FIG. 10, if the attribute page of the first user account is a character attribute page 40, the head portrait, the nickname, a signature, hobbies, and a latest released video of the first user account are displayed on the character attribute page 40. In some embodiments, the attribute page 40 further includes at least one piece of the following information: a gender, a phone number, a two-dimensional code, a photo album, or a personal zone. In some embodiments, the attribute page of the first user account includes attribute information of the first user account.

Step 510: The first client displays a character attribute page of the second user account in response to a second trigger instruction on the name of the second user account.

Likewise, when the user clicks/taps the name of the second user account in the interaction message, the second trigger instruction is triggered on the first client. The first client displays an attribute page of the second user account according to the second trigger instruction.

In some embodiments, the attribute page of the second user account includes attribute information of the second user account.

In some embodiments, when a chat interface of any client displays an interaction message transmitted by the client or others, the client displays an attribute page of a user account in response to a trigger instruction on a name of the user account in the interaction message.

In conclusion, according to the method provided in this embodiment of this application, the client displays the character attribute page of the user account in response to the trigger instruction on the name of the user account in the interaction message. Therefore, a human-computer interaction manner enabling quick viewing of the attribute page of the user account can be provided in the chat interface, thereby enhancing human-computer interaction efficiency.

Figure 11:
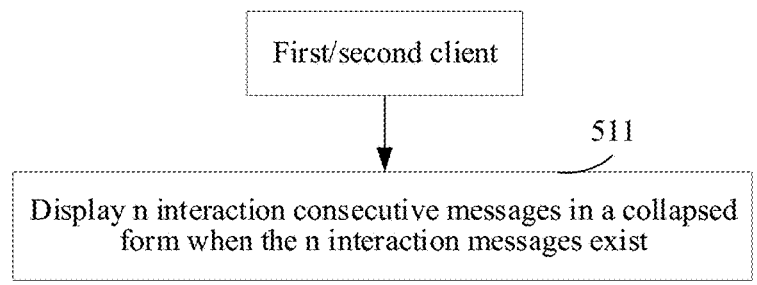
FIG. 11 is a flowchart of a message transmitting/receiving method according to one example embodiment.

In an example embodiment based on FIG. 5, the method further includes step 511, as shown in FIG. 11.

Step 511: Display n consecutive interaction messages in a collapsed form when the n interaction messages exist.

When n consecutive interaction messages exist in a chat interface of any client, all or some of the n interaction messages may be displayed in a collapsed form according to a collapsing policy.

In some embodiments, the collapsing policy includes at least one of a read collapsing policy or an interruption collapsing policy.

I. Read collapsing policy:

The first client displays all or some of the n consecutive interaction messages in a collapsed form in response to the n interaction messages existing in the first chat interface and the n interaction messages all being in a read state, n being an integer greater than 1. Likewise, the second client displays all or some of the n consecutive interaction messages in a collapsed form in response to the n interaction messages existing in the second chat interface and the n interaction messages all being in a read state, n being an integer greater than 1.

Figure 12:
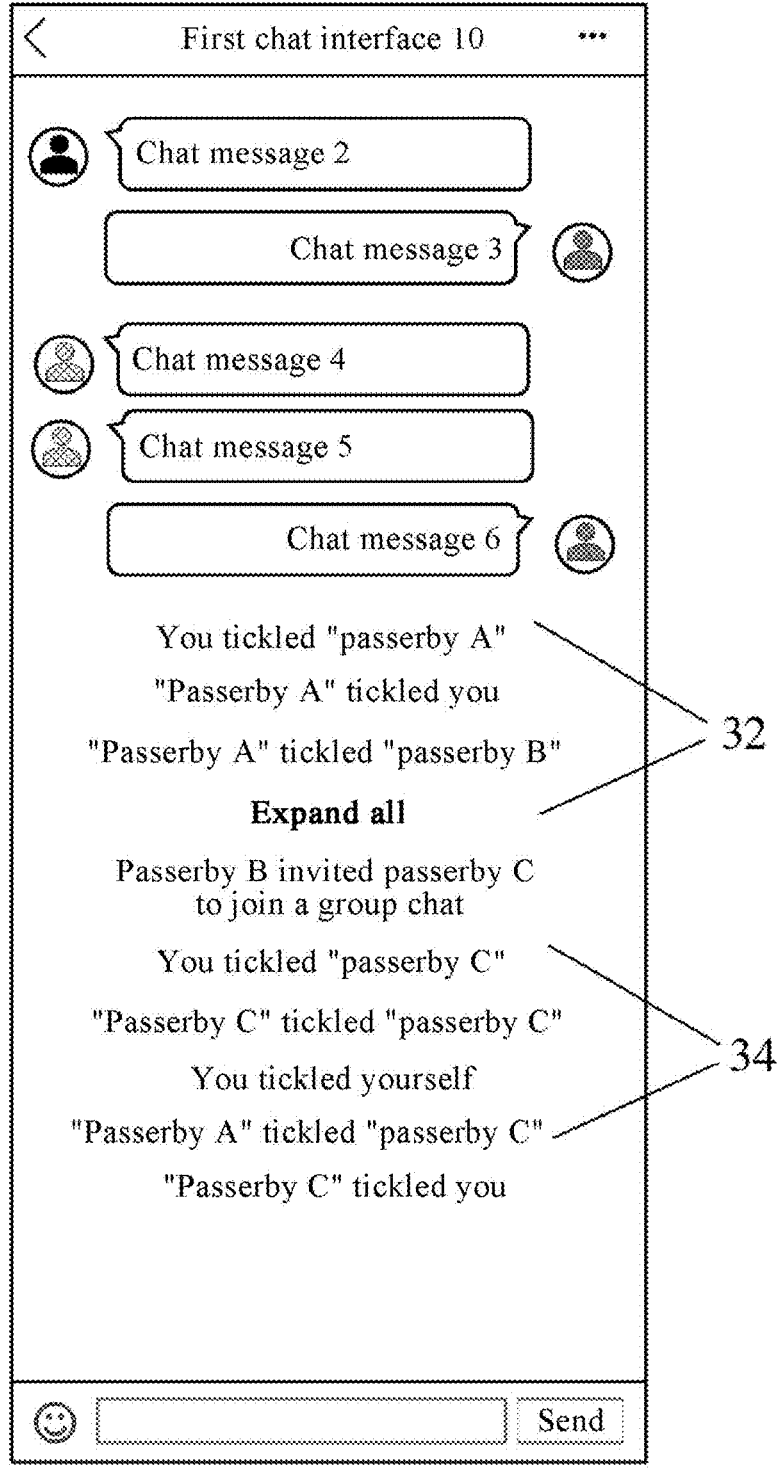
FIG. 12 is a schematic diagram of an interface of a read collapsing policy according to one example embodiment.

As shown in FIG. 12, when the first chat interface 10 has five consecutive interaction messages 32 in the read state, the first client displays the last two of the five interaction messages 32 in a collapsed form. An "expand all" button is displayed at the two collapsed interaction messages. When the user clicks/taps the "expand all" button, the two interaction messages are restored and displayed.

However, if the first four interaction messages in the five consecutive interaction messages 34 are in the read state and the last one interaction message is in an unread state, the five interaction messages are temporarily not collapsed.

II. Interruption collapsing policy:

The first client displays all or some of m consecutive interaction messages in response to the m interaction messages existing in the first chat interface and the m interaction messages all being prior to a last non-interaction message, the non-interaction message being a message other than the interaction message, for example, the non-interaction message being a chat message or a system message, and m being an integer greater than 1. Likewise, the second client displays all or some of the m consecutive interaction messages in response to the m interaction messages existing in the second chat interface and the m interaction messages all being prior to the last non-interaction message, m being an integer greater than 1.

Figure 13:
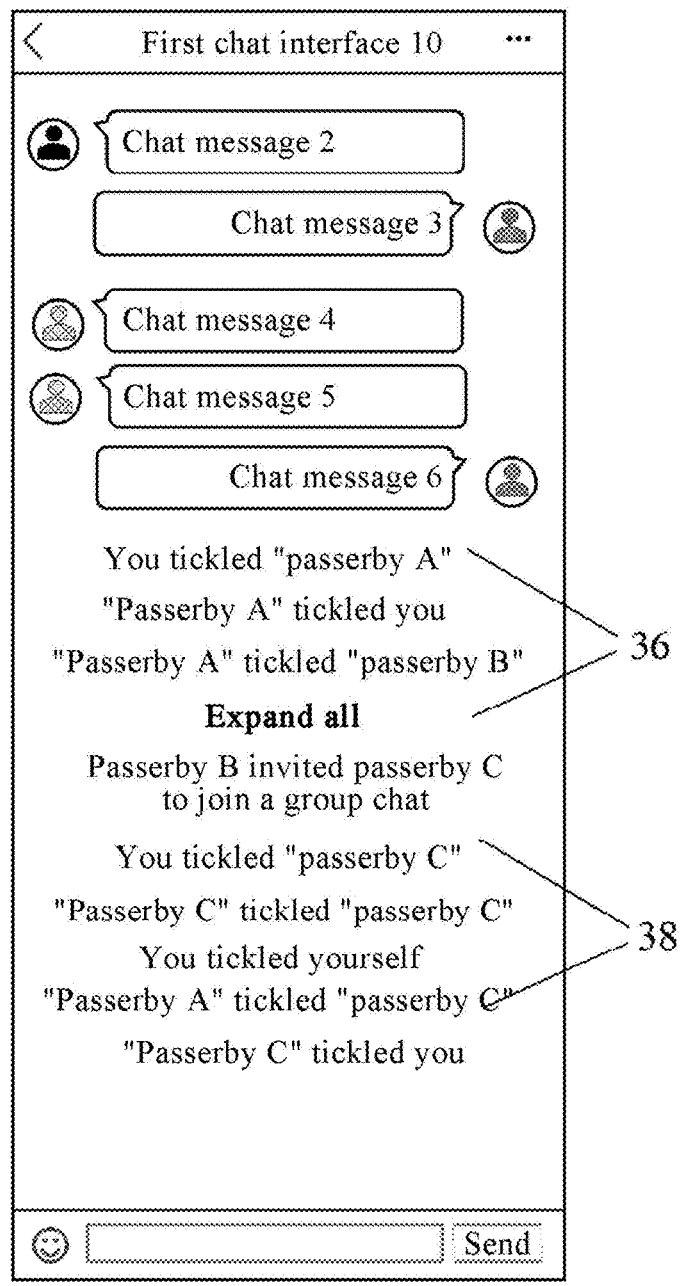
FIG. 13 is a schematic diagram of an interface of an interrupt collapsing policy according to one example embodiment.

As shown in FIG. 13, when the first chat interface has a plurality of (more than five) interrupted consecutive interaction messages 36, the first three interaction messages are reserved and displayed, and the remaining interaction messages are displayed in a collapsed form. An "expand all" button is displayed at the plurality of collapsed interaction messages. When the user clicks/taps the "expand all" button, the plurality of interaction messages are restored and displayed. The plurality of interaction messages 36 are interrupted by a system message "passerby B invited passerby C to join the group chat". Since a plurality of interaction messages 38 are not interrupted, the plurality of interaction messages 38 are temporarily not collapsed.

In view of the above collapsing policy, this application may include the following features.
1. If a non-interaction message (for example, a chat message or a system message) exists between two interaction messages, continuous counting is restarted from a first interaction message after the non-interaction message.
2. If a time division stamp (for example, 13:20) exists between two interaction messages, the time division stamp does not affect the continuous counting between the two interaction messages, and the time division stamps are ignored when messages are expanded for display again.
3. For a plurality of consecutive interaction messages not interrupted by the non-interaction message, the plurality of consecutive interaction messages are stored in a same DB. The DB is a DB in the client for storing messages. One DB message has a plurality of sub-messages. Each sub-message is used for storing one interaction message. After the interaction message is stored by using the DB message, if the client receives another interaction message and an interrupt from a non-interaction message exists, the another interaction message is stored in the DB message content by updating message content. If the client receives another interaction message and an interrupt from a non-interaction message exists, the another interaction message is stored by creating a new DB message.
4. The read state of the interaction message is updated according to a swiping state of the user on the client, or updated depending on whether the head portrait animation of the second user account has been displayed. In an example, after the second client displays the head portrait animation of the head portrait of the second user account, a state of the interaction message is set as the read state. In another example, when a display position of the interaction message is 20% below an interface of a screen from top to bottom and after the head portrait animation of the head portrait of the second user account is displayed, the state of the interaction message is set as the read state. The following beneficial effects are ensured: (1) The user has indeed read the interaction message. (2) The head portrait of the second user account exists in a small-half screen in front of the interaction message, so that displaying of the head portrait animation of the head portrait of the second user account is not missed, especially in a scenario of swiping to view the list of chat messages.

Figure 14:
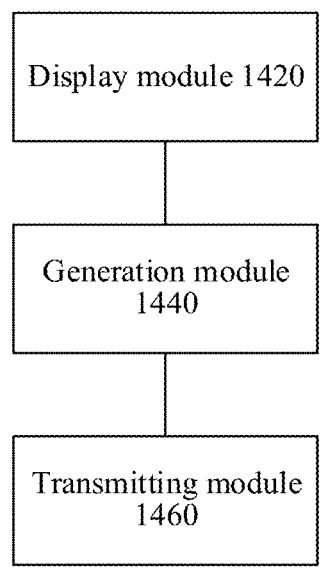
FIG. 14 is a block diagram of a message transmitting apparatus according to one example embodiment.

FIG. 14 is a block diagram of a message transmitting apparatus according to one example embodiment of this application. The apparatus is logged with a first user account. The apparatus includes:
  a display module 1420, configured to display a first chat interface, head portraits of at least two user accounts being displayed in the first chat interface, and the at least two user accounts including the first user account and a second user account;
  a generation module 1440, configured to generate an interaction message in response to an interaction instruction triggered on the head portrait of the second user account; and
  a transmitting module 1460, configured to transmit the interaction message to the second user account, the interaction message being used for triggering displaying of a head portrait animation of the head portrait of the second user account in a second chat interface by a second client, and the second client being logged with the second user account.

In an example embodiment, the generation module 1440 is configured to generate the interaction message in response to a double-click/tap instruction triggered on the head portrait of the second user account.

In an example embodiment, the display module 1420 is configured to display the head portrait animation of the head portrait of the second user account in the first chat interface in response to the interaction instruction triggered on the head portrait of the second user account.

In an example embodiment, the display module 1420 is configured to display the interaction message in the first chat interface.

In an example embodiment, the display module 1420 is configured to display message content of the interaction message in the first chat interface, a message display manner of the interaction message being different from a message display manner of a chat message.

In an example embodiment, the message display manner of the interaction message is same as a message display manner of a system message.

In an example embodiment, the display module 1420 is configured to automatically scroll to a last message in the first chat interface in response to displayed content in the first chat interface not including the last message, the last message including the message content of the interaction message.

In an example embodiment, the message content includes a name of the first user account, a name of the second user account, and a description of an action of the first user account to the second user account,
  the names including at least one of a remark name, a group nickname, or a customized nickname.

In an example embodiment, the description of the action includes, but is not limited to, description related to at least one of the following actions: touch, tickle, hammer, hit, kick, slash, or kiss.

In an example embodiment, the display module 1420 is configured to: display an attribute page of the first user account in response to a first trigger instruction on the name of the first user account; or display an attribute page of the second user account in response to a second trigger instruction on the name of the second user account.

In an example embodiment, the display module 1420 is configured to: display all or some of n consecutive interaction messages in a collapsed form in response to the n interaction messages existing in the first chat interface and the n interaction messages all being in a read state; or display all or some of m consecutive interaction messages in a collapsed form in response to the m interaction messages existing in the first chat interface and the m interaction messages all being prior to a last non-interaction message, m being an integer greater than 1, and the non-interaction message being a message other than the interaction messages.

Figure 15:
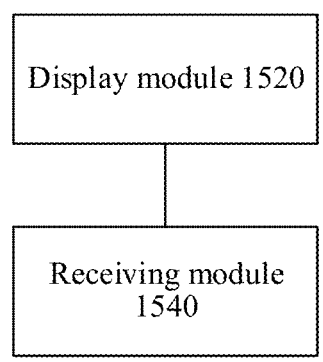
FIG. 15 is a block diagram of a message receiving apparatus according to one example embodiment.

FIG. 15 is a block diagram of a message receiving apparatus according to one example embodiment of this application. The apparatus is logged with a second user account. The apparatus includes:

a display module 1520, configured to display a second chat interface, head portraits of at least two user accounts being displayed in the second chat interface, and the at least two user accounts including a first user account and the second user account; and a receiving module 1540, configured to receive an interaction message transmitted by the first user account to the second user account.

The display module 1520 is configured to display the interaction message in the second chat interface, and display a head portrait animation of the head portrait of the second user account in the second chat interface.

In an example embodiment, the display module 1520 is configured to display message content of the interaction message in the second chat interface, a message display manner of the interaction message being different from a message display manner of a chat message.

In an example embodiment, the display module 1520 is configured to display the head portrait animation of the head portrait of the second user account in a head portrait area corresponding to a chat message transmitted by the second user account and closest to the interaction message.

In an example embodiment, the display module 1520 is configured to: display all or some of n consecutive interaction messages in a collapsed form in response to the n interaction messages existing in the second chat interface and the n interaction messages all being in a read state; or display all or some of m consecutive interaction messages in a collapsed form in response to the m interaction messages existing in the second chat interface and the m interaction messages all being prior to a last non-interaction message.

According to the message transmitting apparatus in the above embodiment, only division of the functional modules is illustrated. In actual application, the functions may be assigned to different functional modules for completion as required. In other words, an internal structure of the device is divided into different functional modules to complete all or a part of the functions described above. In addition, the message transmitting apparatus in the above embodiment belongs to the same idea as the message transmitting method. For an example embodiment, reference may be made to the other method embodiment, as described herein.

Likewise, according to the message receiving apparatus in the above embodiment, only division of the functional modules is illustrated. In actual application, the functions may be assigned to different functional modules for completion as required. In other words, an internal structure of the device is divided into different functional modules to complete all or a part of the functions described above. In addition, the message receiving apparatus in the above embodiment belongs to the same idea as the message receiving method. For other example embodiments, reference may be made to the other method embodiments, as described herein.

This application further provides a computer device (a terminal or a server). The computer device executes a first client. The first client is logged with a first user account. The computer device includes a processor and a memory. The memory stores at least one instruction. The at least one instruction is loaded and executed by the processor to perform the following operations:

displaying a first chat interface, head portraits of at least two user accounts being displayed in the first chat interface, and the at least two user accounts including the first user account and a second user account;

generating an interaction message in response to an interaction instruction triggered on the head portrait of the second user account; and transmitting the interaction message to the second user account, the interaction message being used for triggering displaying of a head portrait animation of the head portrait of the second user account in a second chat interface by a second client, and the second client being logged with the second user account.

In a possible implementation, the at least one instruction is loaded and executed by the processor to perform the following operation:

generating the interaction message in response to a double-click/tap instruction triggered on the head portrait of the second user account.

In a possible implementation, the at least one instruction is loaded and executed by the processor to perform the following operation:

displaying the head portrait animation of the head portrait of the second user account in the first chat interface in response to the interaction instruction triggered on the head portrait of the second user account.

In a possible implementation, the at least one instruction is loaded and executed by the processor to perform the following operation:

displaying a head portrait animation of any one of the head portraits of the second user account in a head portrait area corresponding to the head portrait in response to a double-click/tap instruction triggered on the head portrait.

In a possible implementation, the at least one instruction is loaded and executed by the processor to perform the following operation:

displaying the interaction message in the first chat interface.

In a possible implementation, the at least one instruction is loaded and executed by the processor to perform the following operation:

displaying message content of the interaction message in the first chat interface, a message display manner of the interaction message being different from a message display manner of a chat message.

In a possible implementation, the at least one instruction is loaded and executed by the processor to perform the following operation:

automatically scrolling to a last message in the first chat interface in response to displayed content in the first chat interface not including the last message, the last message including the message content of the interaction message.

In a possible implementation, the message content includes a name of the first user account, a name of the second user account, and a description of an action of the first user account to the second user account, the names including at least one of a remark name, a group nickname, or a customized nickname.

In a possible implementation, the at least one instruction is loaded and executed by the processor to perform the following operation:

displaying an attribute page of the first user account in response to a first trigger instruction on the name of the first user account; or displaying an attribute page of the second user account in response to a second trigger instruction on the name of the second user account.

In a possible implementation, the at least one instruction is loaded and executed by the processor to perform the following operation:

displaying all or some of n consecutive interaction messages in a collapsed form in response to the n interaction messages existing in the first chat interface and the n interaction messages all being in a read state, n being an integer greater than 1; or displaying all or some of m consecutive interaction messages in a collapsed form in response to the m interaction messages existing in the first chat interface and the m interaction messages all being prior to a last non-interaction message, m being an integer greater than 1, and the non-interaction message being a message other than the interaction messages.

This application further provides a computer device (a terminal or a server). The computer device executes a second client. The second client is logged with a second user account. The computer device includes a processor and a memory. The memory stores at least one instruction. The at least one instruction is loaded and executed by the processor to perform the following operations:

displaying a second chat interface, head portraits of at least two user accounts being displayed in the second chat interface, and the at least two user accounts including a first user account and the second user account;

receiving an interaction message transmitted by the first user account to the second user account; and displaying the interaction message in the second chat interface, and displaying a head portrait animation of the head portrait of the second user account in the second chat interface.

In a possible implementation, the at least one instruction is loaded and executed by the processor to perform the following operation:

displaying message content of the interaction message in the second chat interface, a message display manner of the interaction message being different from a message display manner of a chat message.

In a possible implementation, the at least one instruction is loaded and executed by the processor to perform the following operation:

displaying the head portrait animation of the head portrait of the second user account in a head portrait area corresponding to a chat message transmitted by the second user account and closest to the interaction message.

In a possible implementation, the at least one instruction is loaded and executed by the processor to perform the following operation:

displaying all or some of n consecutive interaction messages in a collapsed form in response to the n interaction messages existing in the second chat interface and the n interaction messages all being in a read state; displaying all or some of m consecutive interaction messages in a collapsed form in response to the m interaction messages existing in the second chat interface and the m interaction messages all being prior to a last non-interaction message.

Figure 16:
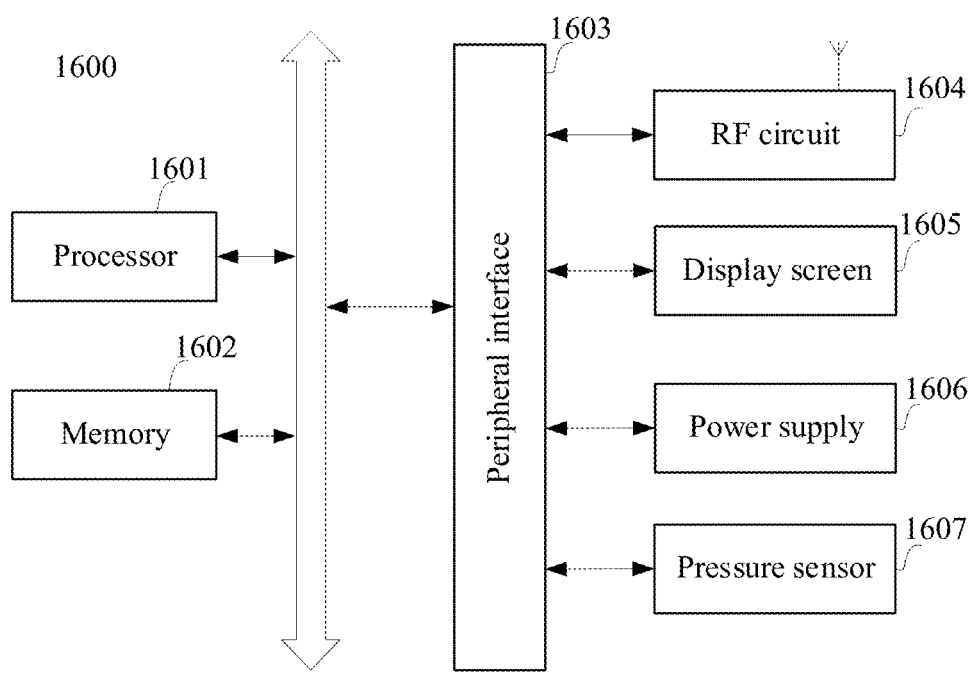
FIG. 16 is a block diagram of a terminal according to one example embodiment.

The computer device may be a computer device provided in FIG. 16.

FIG. 16 is a structural block diagram of a computer device 1600 according to one example embodiment of this application. The computer device 1600 may be a smartphone, a tablet computer, a moving picture experts group audio layer III (MP3) player, a moving picture experts group audio layer IV (MP4) player, a notebook computer, or a desktop computer. The computer device 1600 may also be referred to as other names such as user equipment, a portable computer device, a laptop computer device, or a desktop computer device.

Generally, the computer device 1600 includes a processor 1601 and a memory 1602.

The processor 1601 may include one or more processing cores, such as a 4-core processor or an 8-core processor. The processor 1601 may be implemented by using at least one of the following hardware forms: digital signal processing (DSP), a field-programmable gate array (FPGA), or a programmable logic array (PLA). The processor 1601 may alternatively include a main processor and a coprocessor. The main processor is configured to process data in a wake-up state, which is also referred to as a central processing unit (CPU). The coprocessor is a low-power processor configured to process data in a standby state. In some embodiments, a graphics processing unit (GPU) may be integrated on the processor 1601. The GPU is configured to render and draw content that needs to be displayed on a display screen. In some embodiments, the processor 1601 may further include an artificial intelligence (AI) processor. The AI processor is configured to process computing operations related to machine learning.

The memory 1602 may include one or more non-transitory computer-readable storage media that may be non-transitory. The memory 1602 may further include a high-speed random access memory and a non-volatile memory, for example, one or more magnetic disk storage devices and flash memory storage devices. In some embodiments, the non-transitory computer-readable storage media in the memory 1602 is configured to store at least one instruction. The at least one instruction is used to be executed by the processor 1601 to implement the message transmitting method provided in the method embodiment of this application.

In some embodiments, the computer device 1600 may include a peripheral interface 1603 and at least one peripheral device. The processor 1601, the memory 1602, and the peripheral interface 1603 may be connected by a bus or a signal line. Each peripheral device may be connected to the peripheral interface 1603 by a bus, a signal line, or a circuit board. In some embodiments, the peripheral device includes at least one of a radio frequency (RF) circuit 1604, a display screen 1605, or a power supply 1606.

The peripheral interface 1603 may be configured to connect at least one peripheral device related to input/output (I/O) to the processor 1601 and the memory 1602. In some embodiments, the processor 1601, the memory 1602, and the peripheral interface 1603 are integrated on a same chip or a same circuit board. In some other embodiments, any one or more of the processor 1601, the memory 1602, or the peripheral interface 1603 may be implemented on an independent chip or circuit board. These are merely a few example embodiments, and the processor 1601, the memory 1602, and/or the peripheral interface 1603 may be implemented in various combinations.

The RF circuit 1604 is configured to receive and transmit an RF signal that is also referred to as an electromagnetic signal. The RF circuit 1604 communicates with a communication network and other communication devices through the electromagnetic signal. The RF circuit 1604 converts an electrical signal to an electromagnetic signal for transmission, or converts a received electromagnetic signal to an electrical signal. In some embodiments, the RF circuit 1604 includes an antenna system, an RF transceiver, one or more amplifiers, a tuner, an oscillator, a digital signal processor, a codec chipset, a user identity module card, and the like. The RF circuit 1604 may communicate with other computer devices through at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1604 may further include a near field communication (NFC)-related circuit. These are merely a few examples of how RF circuit 1604 may be configured to receive and transmit an electromagnetic signal.

The display screen 1605 is configured to display a user interface (UI). The UI may include a graph, a text, an icon, a video, and any combination thereof. When the display screen 1605 is a touch display screen, the display screen 1605 further has an ability to collect touch signals on or above a surface of the display screen 1605. The touch signal may be inputted to the processor 1601 as a control signal for processing. The display screen 1605 may be further configured to provide a virtual button and or a virtual keyboard that are also referred to as a soft button and/or a soft keyboard. In some embodiments, there may be one display screen 1605 disposed on a front panel of the computer device 1600. In some other embodiments, there may be at least two display screens 1605 disposed on different surfaces of the computer device 1600 or folded. In some still other embodiments, the display screen 1605 may be a flexible display screen disposed on a bent surface or a folded surface of the computer device 1600. The display screen 1605 may alternatively be configured as a non-rectangular irregular figure, that is, a special-shaped screen. The display screen 1605 may be made of materials such as a liquid crystal display (LCD) or an organic light-emitting diode (OLED).

The power supply 1606 is configured to supply power to assemblies in the computer device 1600. The power supply 1606 may be an alternating current battery, a direct current battery, a disposable battery, or a rechargeable battery. When the power supply 1609 includes the rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the computer device 1600 further includes a pressure sensor 1607. The pressure sensor 1607 may be disposed at a side frame of the computer device 1600 and/or an underlayer of the touch display screen 1605. When the pressure sensor 1607 is disposed at the side frame of the computer device 1600, a grip signal of a user on the computer device 1600 may be detected, and the processor 1601 may perform left/right hand recognition or a shortcut operation according to the grip signal collected by the pressure sensor 1607. When the pressure sensor 1607 is disposed at the underlayer of the display screen 1605, the processor 1601 controls an operable control on the UI interface according to a pressure operation performed by the user on the display screen 1605. The operable control includes at least one of a button control, a scroll-bar control, an icon control, and a menu control.

A person skilled in the art may understand that the structure shown in FIG. 16 is merely one example of the computer device 1600, and the computer device may include more or fewer assemblies than those shown in the figure, a combination of some assemblies, or different assembly arrangements.

The memory further includes one or more programs. The one or more programs are stored in the memory, and include instructions for performing the message transmitting method or the message receiving method provided by the embodiments of this application.

This application provides a non-transitory computer-readable storage medium. The computer-readable storage medium stores at least one instruction. The at least one instruction is loaded and executed by a processor to implement the message transmitting method or the message receiving method provided in the above method embodiments.

This application further provides a computer program product. The computer program product, when executed on a computer, causes a computer to perform the message transmitting method or the message receiving method provided in the above method embodiments.

The sequence numbers of the foregoing embodiments of this application are merely for description purpose, and are not intended to indicate the preference among the embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A message transmitting method comprising:
    displaying a first chat interface that comprises head portraits of a first user account and head portraits of a second user account, wherein the head portraits of the first user account correspond to chat messages of the first user account and the head portraits of the second user account correspond to chat messages of the second user account;
    generating an interaction message in response to an interaction with the head portrait of the second user account, wherein the interaction message comprises an action identifier used to indicate an action of the first user account to the second user account and an interaction identifier used to indicate that a message type of the interaction message is the interaction message, wherein the message type of the interaction message is different from the chat messages of the first user account and the chat messages of the second user account; and
    transmitting the interaction message to a server configured to verify that the interaction message meets a transmission condition, wherein
        if the interaction message meets the transmission condition, transmitting the interaction message to the second user account, the interaction message being configured to trigger a displaying of an animation of the head portrait of the second user account in a second chat interface; and
        if the interaction message does not meet the transmission condition, receiving a failure prompt from the server.

2. The method according to claim 1, wherein the interaction comprises a double-click or a tap.

3. The method according to claim 1, further comprising:
displaying the animation of the head portrait of the second user account in the first chat interface in response to the interaction.

4. The method according to claim 3, wherein the displaying the animation of the head portrait further comprises:
displaying an animation of at least one of a plurality of head portraits of the second user account in a head portrait area.

5. The method according to claim 1, further comprising:
displaying a message content of the interaction message in the first chat interface, a message display manner of the interaction message being different than a message display manner of a chat message.

6. The method according to claim 5, wherein the displaying the message content of the interaction message further comprises:
scrolling, automatically in response to displayed content in the first chat interface not including a last message, to the last message in the first chat interface, the last message comprising the message content of the interaction message.

7. The method according to claim 5, wherein the message content comprises a name of the first user account, a name of the second user account, and a description of an action of the first user account, names comprising at least one of a remark name, a group nickname, or a customized nickname.

8. The method according to claim 7, further comprising:
displaying an attribute page of the first user account in response to an interaction with the name of the first user account.

9. The method according to claim 5, further comprising:
displaying at least one of n consecutive interaction messages in a collapsed form in response to the n interaction messages in the first chat interface, the n interaction messages being in a read state.

10. The method according to claim 5, further comprising:
displaying at least one of m consecutive interaction messages in a collapsed form in response to the m interaction messages in the first chat interface, the m interaction messages being prior to a last non-interaction message, and the non-interaction message being a message other than the m interaction messages.

11. The message transmitting method of claim 1, wherein the verifying that the interaction message meets a transmission condition comprises:
calculating a sum of the quantity of times that the first user account and the quantity of times that the second user account transmit the interaction message, and
determining that the interaction message does not meet the transmission condition when the sum exceeds a threshold.

12. A computer device, comprising a processor and a memory, the memory storing at least one instruction, at least one program, a code set, or an instruction set, and the at least one instruction, the at least one program, the code set, or the instruction set being loaded and executed by the processor to implement the message transmitting method according to claim 1.

13. A non-transitory computer-readable storage medium, storing at least one instruction, at least one program, a code set, or an instruction set, the at least one instruction, the at least one program, the code set, or the instruction set being loaded and executed by a processor to implement the message transmitting method according to claim 1.

14. A message receiving method comprising:
displaying a chat interface that comprises head portraits of a first user account and head portraits of a second user account, wherein the head portraits of the first user account correspond to chat messages of the first user account and the head portraits of the second user account correspond to chat messages of the second user account;
receiving an interaction message transmitted by the first user account to the second user account;
displaying the interaction message in the chat interface of the second user account;
determining the chat message of the second user account closest to the interaction message;
displaying an animation of the head portrait of the second user account in the chat interface on the head portrait corresponding to the closest chat message; and
updating a read state of the interaction message in accordance with whether the animation of the head portrait has been displayed.

15. The method according to claim 14, wherein the displaying the interaction message comprises:
displaying a message content of the interaction message in the second chat interface, a message display manner of the interaction message being different than a message display manner of a chat message.

16. The method according to claim 14, wherein the displaying the animation of the head portrait comprises:
displaying the animation of the head portrait in a head portrait area corresponding to a chat message transmitted by the second user account closest to the interaction message.

17. The method according to claim 14, further comprising:
displaying at least one of n consecutive interaction messages in a collapsed form in response to the n interaction messages in the second chat interface, the n interaction messages being in a read state.

18. The method according to claim 14, further comprising
displaying at least one of m consecutive interaction messages in a collapsed form in response to the m interaction messages in the second chat interface, the m interaction messages being prior to a last non-interaction message, and the non-interaction message being a message other than the m interaction messages.

19. A message transmitting apparatus comprising:
a memory, the memory storing computer-readable instructions for transmitting a message; and
a processor in communication with the memory, the processor configured by the computer readable instructions to:
display a first chat interface and head portraits of a first user account and head portraits of a second user account, wherein the head portraits of the first user account correspond to chat messages of the first user account and the head portraits of the second user account correspond to chat messages of the second user account;
generate an interaction message in response to an interaction with the head portrait of the second user account, wherein the interaction message comprises an action identifier used to indicate an action of the first user account to the second user account and an interaction identifier used to indicate that a message type of the interaction message is the interaction message, wherein the message type of the interaction message is different from the chat messages of the first user account and the chat messages of the second user account; and transmit the interaction message to a server configured to verify that the interaction message meets a transmission condition, wherein if the interaction message meets the transmission condition, transmit the interaction message to the second user account, the interaction message being configured to trigger a displaying of an animation of the head portrait of the second user account in a second chat interface; and if the interaction message does not meet the transmission condition, receive a failure prompt from the server.

20. The message receiving apparatus according to claim 19, the processor being further configured by the computer readable instructions to:

receive an interaction message transmitted by the second user account to the first user account, display the interaction message and the animation of the head portrait of the first user account in the first chat interface.

\* \* \* \* \*